United States Patent
Park

(10) Patent No.: US 8,947,649 B2
(45) Date of Patent: Feb. 3, 2015

(54) APPARATUS AND METHOD FOR DETERMINING OPTICAL CENTER IN CAMERA MODULE

(71) Applicant: LG Innotek Co., Ltd., Seoul (KR)

(72) Inventor: Sejin Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/026,475

(22) Filed: Sep. 13, 2013

(65) Prior Publication Data

US 2014/0071440 A1    Mar. 13, 2014

(30) Foreign Application Priority Data

Sep. 13, 2012    (KR) .................. 10-2012-0101759

(51) Int. Cl.
   *G01B 9/00*   (2006.01)
   *G01M 11/02*   (2006.01)

(52) U.S. Cl.
   CPC ................. *G01M 11/0221* (2013.01)
   USPC .......................................... 356/127; 356/124

(58) Field of Classification Search
   CPC ................. G01M 11/0221; B24B 13/0055
   USPC .................................. 356/124–127
   See application file for complete search history.

(56) References Cited

U.S. PATENT DOCUMENTS

2008/0297776 A1* 12/2008 Mizuno et al. .............. 356/125
2012/0084049 A1*  4/2012 Quan et al. ................. 702/150

* cited by examiner

*Primary Examiner* — Tri T Ton
(74) *Attorney, Agent, or Firm* — Birch, Stewart, Kolasch & Birch, LLP

(57) ABSTRACT

An apparatus and method for determining optical center in camera module are provided, the method for determining optical center in camera module according to an exemplary embodiment comprising receiving a target image from a camera module including a lens; generating an error data, which is a difference between a pixel value of the target image and a pixel value of a Gaussian distribution image; and determining the optical center of the lens based on the error data.

13 Claims, 5 Drawing Sheets

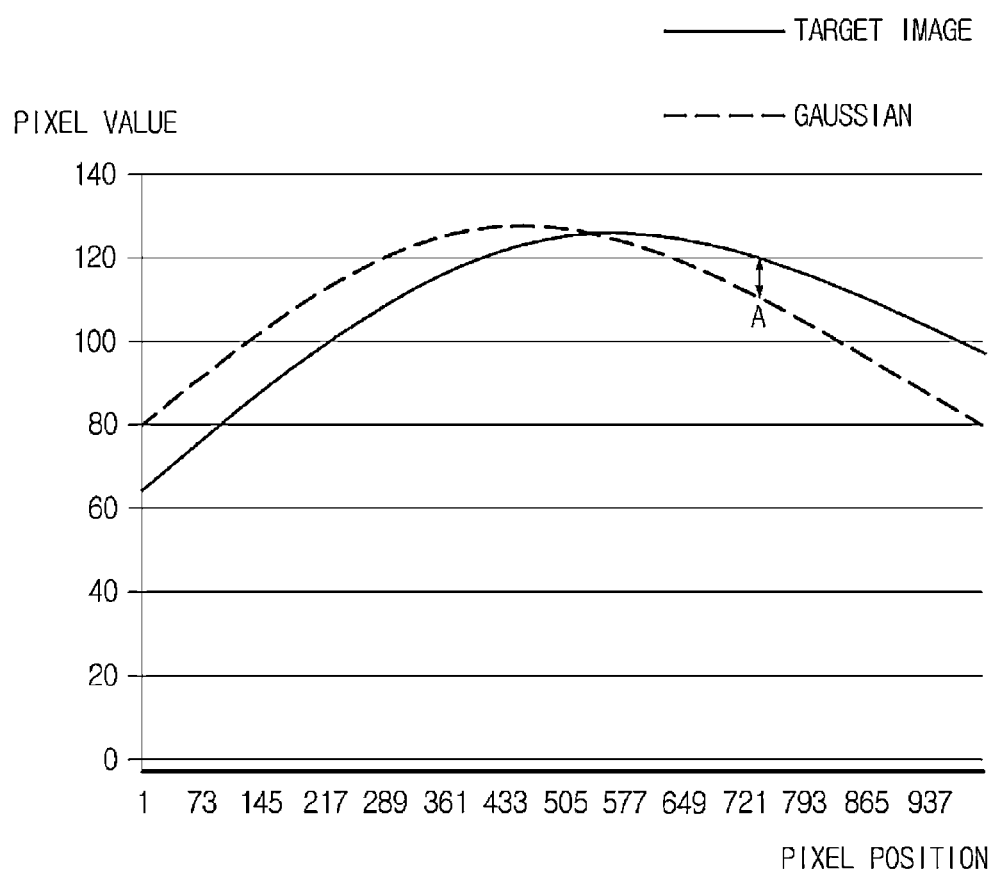

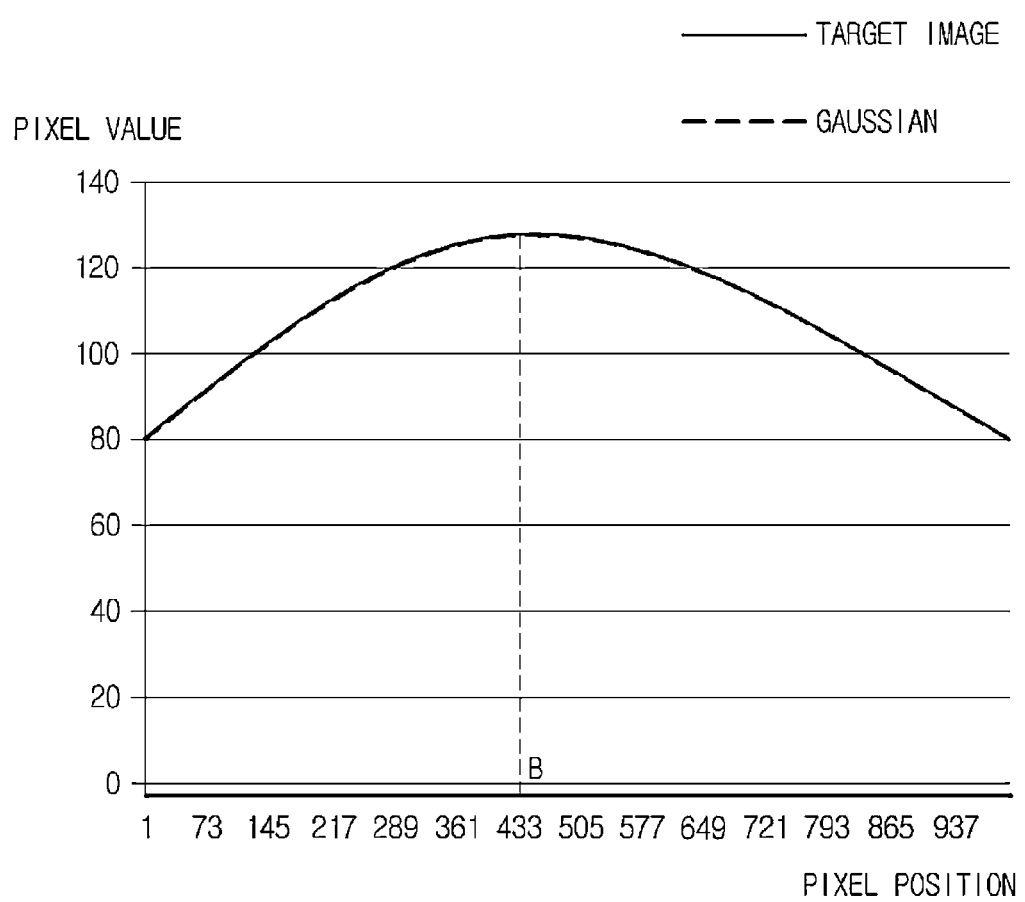

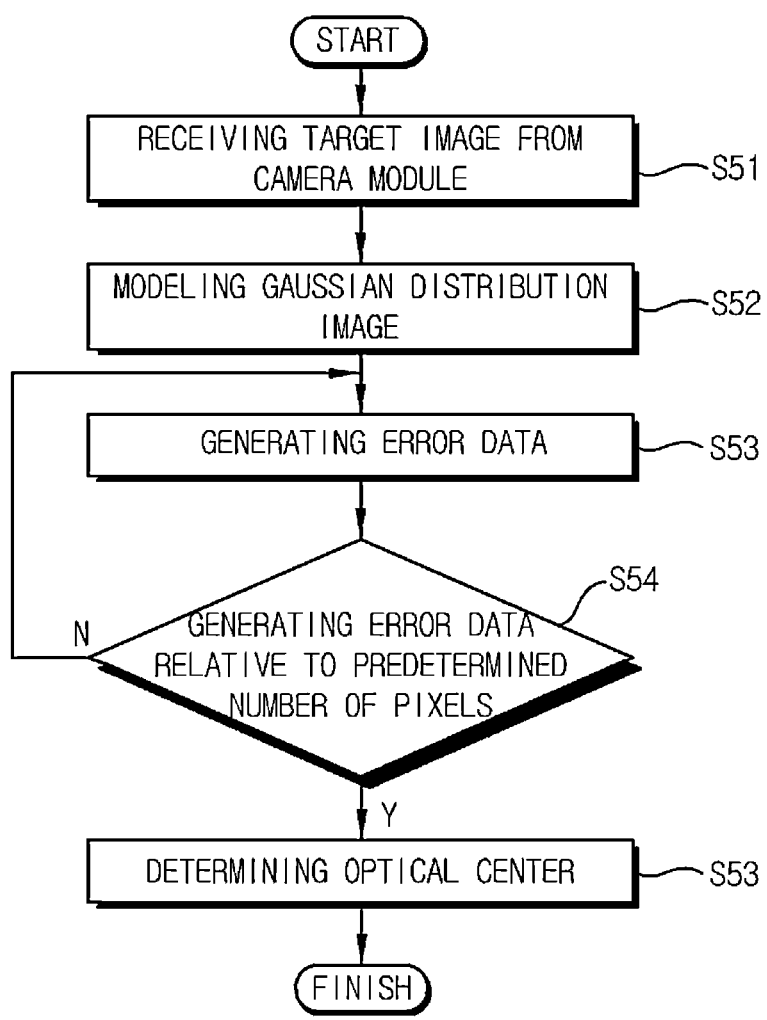

APPARATUS AND METHOD FOR DETERMINING OPTICAL CENTER IN CAMERA MODULE

CROSS-REFERENCE TO RELATED APPLICATION

The present application is based on, and claim priority from, Korean Application Numbers 10-2012-0101759, filed on Sep. 13, 2012, the disclosures of which is incorporated by reference herein in its entirety.

BACKGROUND OF THE INVENTION

1. Field of the Invention

Exemplary aspects of the present disclosure relate to an apparatus and method for determining optical center in camera module.

2. Description of Related Art

In general, a position of a lens on which an image is captured in a sensor of a camera module is called an optical center. The optical center was conventionally measured by using a method of obtaining a centroid relative to a round range having a threshold in an image, but this method suffers from disadvantages in that it is seriously affected by an image noise and evenness of lens shading.

This method also suffers from disadvantages in that a great deviation is generated by setting of a threshold, because the shading itself is widely spread, and a measurement subject takes only a portion having the same threshold.

SUMMARY OF THE INVENTION

Exemplary aspects of the present disclosure are to substantially solve at least the above problems and/or disadvantages and to provide at least the advantages as mentioned below. Thus, the present disclosure is directed to provide an apparatus for determining optical center in camera module configured to measure an optical center from an entire distribution of lens shading, and a method for determining the optical center in a camera module.

In one general aspect of the present disclosure, there may be provided an apparatus for determining an optical center in a camera module, the apparatus comprising: a camera module configured to obtain a target image through a lens; and a determinator configured to determine an optical center of the lens by using a pixel value of the target image obtained by the camera module.

In some exemplary of the present invention, the camera module may comprise: the lens; and a sensor unit configured to obtain the target image incident through the lens.

In some exemplary of the present invention, the target image may include an image obtained by photographing an illumination of a predetermined light emitting device.

In some exemplary of the present invention, the light emitting device may include an LED (Light Emitting Diode).

In some exemplary of the present invention, the determinator may comprise: a modeling unit configured to model a Gaussian distribution image; a generating unit configured to generate an error data, which is a difference between the pixel value of the target image and a pixel value of the Gaussian distribution image; and a center determinator configured to determine the optical center of the lens based on the error data.

In some exemplary of the present invention, the determinator may further comprise: a receiver configured to receive the target image from the camera module.

In some exemplary of the present invention, the Gaussian distribution image may be configured such that the pixel value indicates a vignetting distribution.

In some exemplary of the present invention, the generating unit may generate the error data of center and a plurality of pixels about the center of the target image based on the center of the target image.

In some exemplary of the present invention, the center determinator may be configured to determine a pixel, as the optical center of the lens, where a sum of the error data of the plurality of pixels is minimized.

In one general aspect of the present disclosure, there may be provided a method for determining an optical center in a camera module, the method comprising: receiving a target image from a camera module including a lens; generating an error data, which is a difference between a pixel value of the target image and a pixel value of a Gaussian distribution image; and determining the optical center of the lens based on the error data.

In some exemplary of the present invention, the target image may include an image obtained by photographing an illumination of a predetermined light emitting device.

In some exemplary of the present invention, the Gaussian distribution image may be configured such that the pixel value indicates a vignetting distribution.

In some exemplary of the present invention, the generating the error data may comprise generating the error data of center and a plurality of pixels about the center of the target image based on the center of the target image.

In some exemplary of the present invention, the determining the optical center may comprise determining a pixel, as the optical center of the lens, where a sum of the error data of the plurality of pixels is minimized.

The present disclosure has an advantageous effect in that an accurate optical center can be determined in a camera module, to reduce a defect rate of the camera module caused by measurement error.

The present disclosure has another advantageous effect in that an influence of a lens on an optical performance can be precisely certified by a more accurate measurement of an optical center of the lens, in a case there develops a problem on an optical performance of a camera module.

BRIEF DESCRIPTION OF THE DRAWINGS

FIG. 3 is a schematic view illustrating error data generated by an error generating unit according to an exemplary embodiment of the present disclosure.

FIG. 4 is a schematic view illustrating error data at an optical center determined by an optical center determinator according to an exemplary embodiment of the present disclosure.

FIG. 5 is a flowchart illustrating a method for determining an optical center in a camera module according to an exemplary embodiment of the present disclosure.

DETAILED DESCRIPTION OF PREFERRED EMBODIMENTS

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 1:
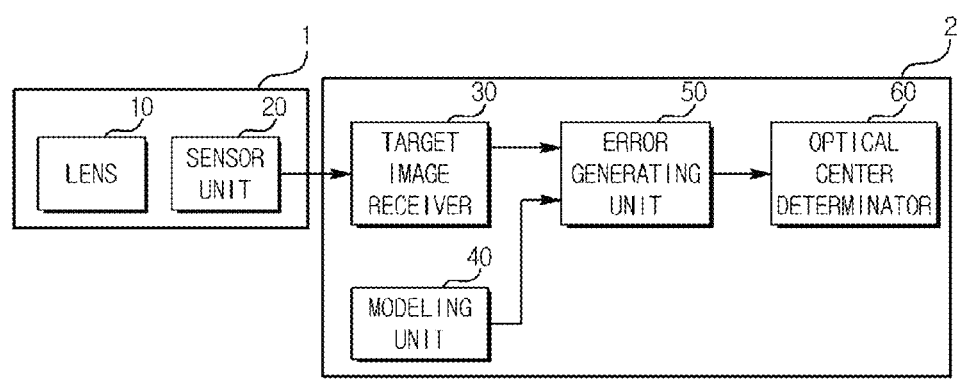
FIG. 1 is a block diagram illustrating an apparatus for determining an optical center in a camera module according to an exemplary embodiment of the present disclosure.

FIG. 1 is a block diagram illustrating an apparatus for determining an optical center in a camera module according to an exemplary embodiment of the present disclosure.

Referring to FIG. 1, the apparatus (2) for determining an optical center in a camera module according to an exemplary embodiment of the present disclosure (hereinafter referred to as "apparatus") may receive a target image from a camera module (1). The camera module (1) comprises a lens (10) and a sensor unit (20), and the apparatus (2) comprises a target image receiver (30), a modeling unit (40), an error generating unit (50), and an optical center determinator (60).

The target image receiver (30) receives the target image from the camera module (1). The camera module (1) comprises a lens (10) and a sensor unit (20). The sensor unit (20) may detect an image incident through the lens (10). The sensor unit (20) may be a CCD (Charged Coupled Device) sensor or a CMOS (Complementary Metal-Oxide Semiconductor) sensor, for example. However, it should be apparent to the skilled in the art that the sensor unit (20) is not limited to the CCD sensor or the CMOS sensor, and any other devices capable of performing similar functions thereto may be used for the sensor unit (20).

The camera module (1) may comprise other various components in addition to the lens (10) and the sensor unit (20). However, the other components are irrelevant to the exemplary embodiments of the present disclosure, and therefore explanation thereto is omitted.

The target image received by the target image receiver (30) according to an exemplary embodiment of the present disclosure is obtained by photographing an illumination, by the camera module (1), of a predetermined light emitting device, e.g., an LED (Light Emitting Diode). Gradation of the target image obtained by photographing the predetermined light emitting device is influenced only by the characteristic of a lens to allow having a vignetting.

The modeling unit (20) may model a Gaussian distribution image having a vignetting distribution similar to that of the target image. At this time, the Gaussian distribution image can be performed by the following Equation 1.

$$\left(e^{-\left(\frac{x^2+y^2}{2\sigma^2}\right)}\right) / \left(\frac{1}{2\delta^2}\right)$$ [Equation 1]

where σ is a weight of distribution, and δ is a mask size.

Figure 2A:
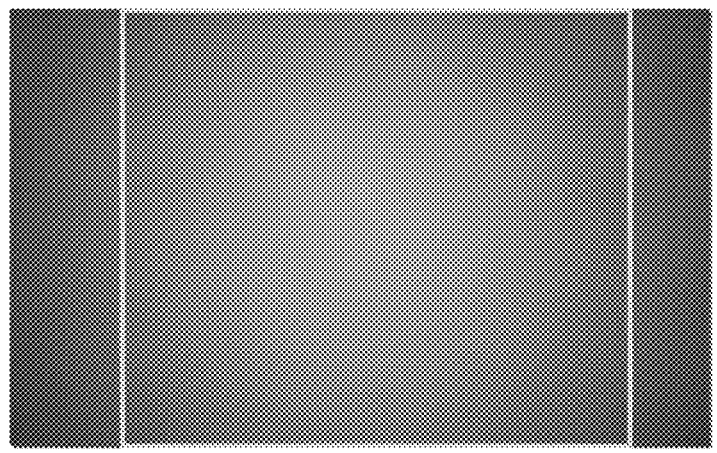
FIG. 2a is a schematic view of a target image received by a receiver according to an exemplary embodiment of the present disclosure.
Figure 2B:
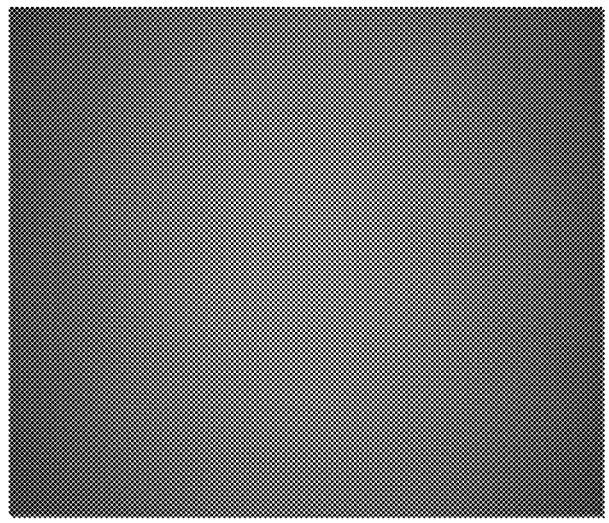
FIG. 2b is a schematic view of a Gaussian distribution image modeled by a modeling unit according to an exemplary embodiment of the present disclosure.

FIG. 2a is a schematic view of the target image received by a target image receiver (30) according to an exemplary embodiment of the present disclosure, and FIG. 2b is a schematic view of the Gaussian distribution image modeled by a modeling unit (40) according to an exemplary embodiment of the present disclosure.

The error generating unit (50) may align the target image received from the target image receiver (30) and the Gaussian distribution image received from the modeling unit (40) about a center of the target image to generate error data. That is, a difference (error) between a pixel value of the target image and a pixel value of the Gaussian distribution image can be determined, where the pixel value means an RGB value.

FIG. 3 is a schematic view illustrating an error data generated by an error generating unit (50) according to an exemplary embodiment of the present disclosure.

Referring to FIG. 3, it can be learned that the Gaussian distribution image indicates a pixel value distributed in a predetermined pattern. That is, the pixel value of the Gaussian distribution image may display a Gaussian distribution, and the error generating unit (50) may generate error data of the Gaussian distribution image by changing the center of the target image. To be more specific, 'A' in FIG. 3 is the error data of the target image relative to the Gaussian distribution image.

The error generating unit (50) may generate the error data by changing pixels about the center of the target image. That is, the error data of the target image and the Gaussian distribution image may be generated relative to a predetermined number of pixels, and may generate the error data by limiting the center to 100 pixels (e.g., 400-pixel position to 500-pixel position), for example, which is resulted from the fact that it would create no problem if only the error data for the pixels about the optical center are generated, because the optical center of the target image is already determined.

The optical center determinator (60) determines an optical center of the lens (10) of the camera module (1) based on the error data generated by the error generating unit (50). That is, a pixel where a sum of error data at all pixel positions is minimized may be determined as the optical center of the lens (10) at the camera module (1) by the optical center determinator (60).

FIG. 4 is a schematic view illustrating error data at an optical center determined by the optical center determinator (60) according to an exemplary embodiment of the present disclosure.

Referring to FIG. 4, the optical center determinator (60) according to an exemplary embodiment of the present disclosure determines, as the optical center of the lens (10), a point where a sum of each error data, which is a difference between the target image and the Gaussian distribution image at a point, is minimized, where, in FIG. 4, the error data are hardly existent, such that an optical center (B) is an optical center of the lens (10).

Furthermore, although the exemplary embodiment of the present disclosure has explained that the error generating unit (50) and the optical center determinator (60) are separately disposed, they are not configured separately. That is, the error generating unit (50) and the optical center determinator (60) may be one element to perform the function of the error generating unit (50) and the optical center determinator (60) explained above.

FIG. 5 is a flowchart illustrating a method for determining an optical center in a camera module according to an exemplary embodiment of the present disclosure.

Referring to FIG. 5, first, the target image receiver (30) receives a target image obtained by the sensor unit (20) of the camera module (1) (S51). The target image is obtained by photographing an illumination, by the camera module (1), of a predetermined light emitting device, e.g., an LED (Light Emitting Diode), which has been already explained.

Successively, the modeling unit (40) models the Gaussian distribution image using the Equation 1 (S52), and the error generating unit (50) generates an error data, which is a difference between the target image and the Gaussian distribution image at a point, based on the center of the target image (S53).

The error generating unit (50) generates the error data while changing the center of the target image, where the error data between the target image and the Gaussian distribution image may be generated relative to a predetermined number of pixels.

That is, in a case the error data are generated as many as the predetermined number of pixels based on the center of the target image (S54), the optical center determinator (60) may determine, as an optical center of the lens (10) at the camera module (1), a pixel where a sum of error data of all the pixels is minimized (S55).

That is, the optical center determinator (60) may determine the pixel where the sum of error data of all the pixels is minimized by checking the sum of error data relative to a predetermined number of pixels.

As apparent from the foregoing, an accurate optical center of the lens (10) of the camera module (1) can be determined by the exemplary embodiments of the present disclosure.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for determining an optical center in a camera module, the apparatus comprising:
   a camera module configured to obtain a target image through a lens; and
   a determinator configured to determine an optical center of the lens by using a pixel value of the target image obtained by the camera module,
   wherein the determinator comprises:
      a modeling unit configured to model a Gaussian distribution image;
      a generating unit configured to generate an error data, which is a difference between the pixel value of the target image and a pixel value of the Gaussian distribution image; and
      a center determinator configured to determine the optical center of the lens based on the error data.

2. The apparatus of claim 1, wherein the camera module comprises:
   the lens; and
   a sensor unit configured to obtain the target image incident through the lens.

3. The apparatus of claim 2, wherein the target image includes an image obtained by photographing an illumination of a predetermined light emitting device.

4. The apparatus of claim 3, wherein the light emitting device includes an LED (Light Emitting Diode).

5. The apparatus of claim 1, wherein the determinator further comprises:
   a receiver configured to receive the target image from the camera module.

6. The apparatus of claim 1, wherein the Gaussian distribution image is configured such that the pixel value indicates a vignetting distribution.

7. The apparatus of claim 1, wherein the generating unit generates the error data of center and a plurality of pixels about the center of the target image based on the center of the target image.

8. The apparatus of claim 7, wherein the center determinator is configured to determine a pixel, as the optical center of the lens, where a sum of the error data of the plurality of pixels is minimized.

9. A method for determining an optical center in a camera module, the method comprising:
   receiving a target image from a camera module including a lens;
   generating an error data, which is a difference between a pixel value of the target image and a pixel value of a Gaussian distribution image; and
   determining the optical center of the lens based on the error data.

10. The method of claim 9, wherein the target image includes an image obtained by photographing an illumination of a predetermined light emitting device.

11. The method of claim 9, wherein the Gaussian distribution image is configured such that the pixel value indicates a vignetting distribution.

12. The method of claim 9, wherein the generating the error data comprises generating the error data of center and a plurality of pixels about the center of the target image based on the center of the target image.

13. The method of claim 9, wherein the determining the optical center comprises determining a pixel, as the optical center of the lens, where a sum of the error data of the plurality of pixels is minimized.

* * * * *